United States Patent [19]
Hope et al.

[11] 3,784,018
[45] Jan. 8, 1974

[54] APPARATUS FOR THE CONTINUOUS SEPARATION OF FINE PARTICLES FROM LIQUOR

[76] Inventors: William Ernst Hope; Mary Jarvie Hope, both of 56 Merryvale Ave., Giffnock, Scotland; Thomas William McNeil, 6 Wayside Acres, Bodelwydden, Great Britain

[22] Filed: Jan. 24, 1972

[21] Appl. No.: 219,946

[30] Foreign Application Priority Data
Feb. 2, 1971   Great Britain .................... 03673/71

[52] U.S. Cl. ................... 210/393, 210/396, 210/401
[51] Int. Cl. ...................... B01d 33/04, B01d 35/16
[58] Field of Search .................... 210/391, 393, 396, 210/400, 401, 499, 330, 77

[56] References Cited
UNITED STATES PATENTS

| | | | |
|---|---|---|---|
| 3,161,522 | 12/1964 | Compton | 210/400 |
| 3,703,963 | 11/1972 | Eguchi et al. | 210/396 |
| 2,457,018 | 12/1948 | Wantling | 210/330 |
| 3,531,404 | 9/1970 | Goodman et al. | 210/400 |
| 272,324 | 2/1883 | Renwick | 210/396 |
| 3,358,834 | 12/1967 | El-Hindi | 210/391 |

FOREIGN PATENTS OR APPLICATIONS

| | | | |
|---|---|---|---|
| 429,819 | 4/1911 | France | 210/391 |
| 875,109 | 7/1971 | Canada | 210/400 |

*Primary Examiner*—Frank A. Spear, Jr.
*Assistant Examiner*—Benoit Castel
*Attorney*—Linton & Linton

[57] ABSTRACT

The invention provides filtering apparatus capable of continuous operation and without the need for shut down periods for cleaning the filter elements. The apparatus broadly comprises an endless filter conveyor, means for driving said conveyor at an appropriate speed, a catchment tank wherethrough a part at least of the operative run of said conveyor is guided below the liquid level in said catchment tank, retaining walls the lower edges whereof are in contact with said filter conveyor, means for directing liquid to be treated onto said conveyor within the confines of said retaining walls, an outlet in said catchment tank for removing treated liquid, and means for removing deposited solids from the filter conveyor.

6 Claims, 3 Drawing Figures

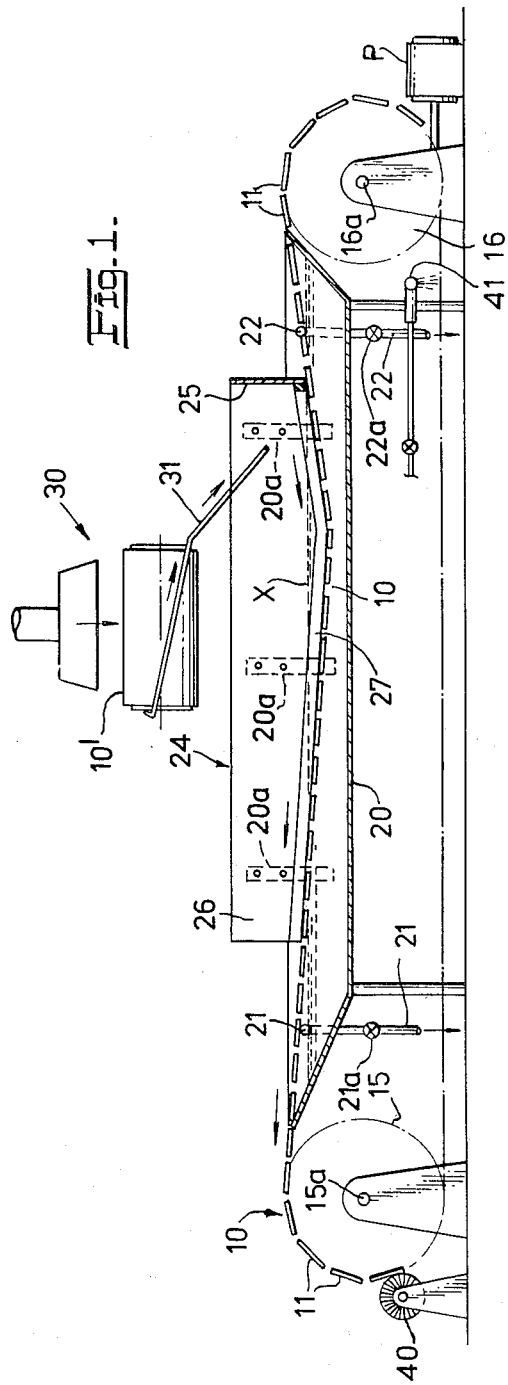

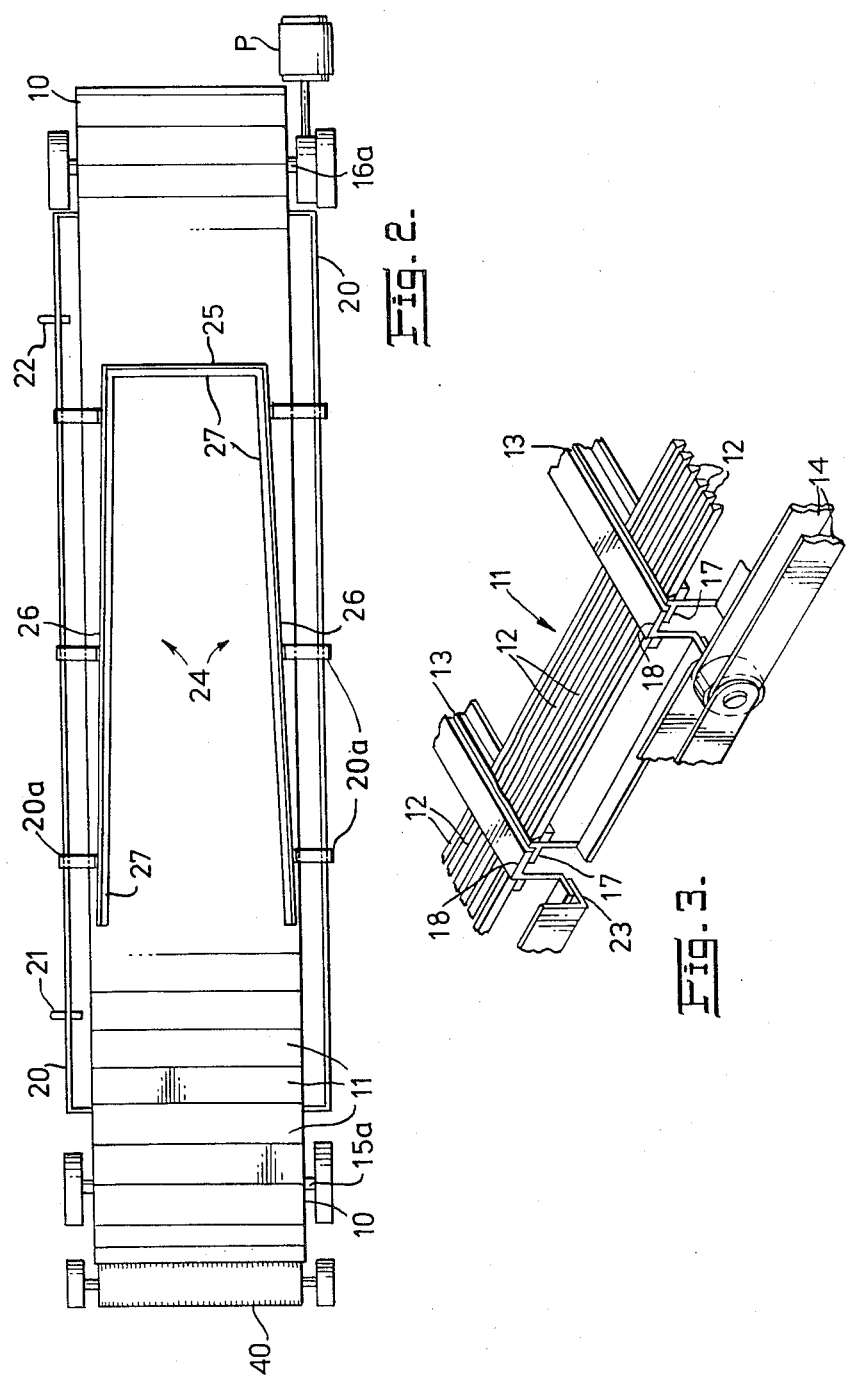

APPARATUS FOR THE CONTINUOUS SEPARATION OF FINE PARTICLES FROM LIQUOR

This invention is concerned with apparatus for the continuous separation of solids from liquor, for example in the clarification of effluents which are to be discharged into rivers or streams or other waterways, or recirculated for re-use, and has for its object to provide such apparatus which will operate continuously without the need for shut down periods for clearing the filter elements of accumulated deposits.

Several methods of extracting or separating fine solids incorporated in liquids are of course known, as for example so-called thickeners, and various types of weir, the kind of apparatus used depending mainly upon the volume of liquid to be treated and its solids content which in many cases may be relatively small.

The present day urgent need for the prevention of pollution generally imparts considerable importance to the provision of apparatus which will clarify liquor, such as water, containing fine particles of industrial process matter which is running to waste, or which could advantageously be re-circulated for re-use or use in another process.

The primary object of the present invention therefore is to provide apparatus which will deal effectively with fine particles, e.g., particles capable of passing 150 to 300 mesh screen, and finer, and of providing a liquid output containing not more than 50 parts per million, or less, or in some cases, as for example water to be discharged into streams and the like, substantially complete clarity.

According to the invention, and in one mode of embodiment, apparatus for the purpose specified comprises an endless filter conveyor, means for driving said conveyor at a required speed, a catchment tank wherethrough the operative run of said conveyor is guided below a predetermined liquid level in said catchment tank, retaining walls the lower edges whereof bear upon said filter conveyor, means for directing liquid to be treated onto said filter conveyor within the confines of said retaining walls, overflow outlets in said catchment tank for maintaining the liquid level therein and removing treated liquid, and means for removing deposited solids from the filter conveyor.

According to a particular embodiment the filter conveyor may comprise a plurality of perforate plate or panel members, preferably constructed from material not subject to corrosion, such for example as copper, stainless steel, plastics material, or the like and each being formed or provided with suitable stiffening means to impart lateral strength thereto. Each of said filter plates or panels may be attached at each side to an endless roller chain having its pitch centres arranged so as to accomodate said plate or panel members in their movement around driving sprockets or rollers carrying said filter conveyor. Said plate or panel members preferably have overlapping transverse edges or flanges which close the transverse juncture therebetween when in operative position within the catchment tank.

Alternatively, said filter conveyor may comprise a band or web of a suitable woven reticulate material, e.g., wire or a plastics material.

The said retaining walls have an outlet downstream of the inflow to the apparatus and side walls which diverge towards said outlet.

Flocculating agents of many kinds are already in use as means for assisting in the agglomeration in liquids of fine particles, and the present invention may take advantage of such means to provide a high degree of separation.

The invention is further described with the aid of the accompanying drawings which illustrate schematically, and by way of example only, one mode of embodiment.

IN SAID DRAWINGS

FIG. 1 is a sectional side elevation of apparatus for continuously separating fine solids from a liquid inflow, and FIG. 2 is a plan view thereof.

FIG. 3 is a fragmentary view in perspective, drawn to an enlarged scale as compared with the preceding views, depicting a side of the filter conveyor means.

Referring to said drawings, the numeral 10 generally denotes an endless filter conveyor which comprises a series of panels 11 of closely set wedge wires 12 (FIG. 3) which are surrounded by a frame 13 secured at each side to a roller chain as 14. Said roller chains 14 mounted on sprockets or rollers 15, 16 rotating on axes 15a, 16a and one or each of which is driven from a prime mover P, e.g. an electric motor.

Between the upper and lower runs of the filter conveyor 10 there is disposed a catchment tank 20 having overflow outlets 21, 22 which maintain liquid therein at the level X, and the roller chains 14 of the filter conveyor 10 are guided as by means 23 (FIG. 3) so that the upper run of the filter conveyor 10, as shown in FIG. 2, is in part below the level X of liquid in the tank 20. Said tank 20 may have drainage and filling means if so required.

Supported adjustably from the side walls of the tank 20 by brackets 20a is a retaining device 24 which comprises a rear transverse wall 25, and extending forwardly therefrom side walls 26. Said walls 26 diverge in the direction of movement (as indicated by arrows in FIG. 1) of the filter conveyor 10 as shown in FIG. 2. The lower edges of said walls 25, 26, are arranged and shaped so as to be in rubbing engagement with the surface of said filter conveyor 10 and are provided with layers 27 of a resilient material, e.g. a foamed plastics composition or a foamed rubber or rubber like composition, so as to provide a sealing engagement with the filter conveyor 10 and thus prevent the passage of liquids and solids beyond the confines of the retaining device 24.

In use, the filter conveyor 10 is driven at an appropriately slow speed, and liquid to be clarified is delivered thereto, within the confines of the retaining device 24. If a pre-treatment of the liquid is desirable, then the supply of liquid to the filter conveyor 10 may be via a prefiltering device 30 comprising a filter conveyor band 10', which may be similar to that already described and have a chute 31 for delivering the pre-treated solid/liquid mixture to the filter conveyor 10. Any other suitable pre-treatment device or means may of course be employed.

In its movement, the filter conveyor 10 removes solids from the liquid delivered thereto, the treated liquid passing through the orifices in the filter panels 11 to join the main body of liquid in the catchment tank 20. Treated liquid flows from the outlets 21, 22 for disposal or use as required. The level of the liquid in the tank 20 is controlled, e.g., by overflow valves 21a, 22a so as to maintain a depth of liquid above the filter panels suited to the matter being separated out.

The retaining device 24 maintains the liquid/solid mixture delivered to the filter conveyor 10 within the filtering area, and the seal provided between the lower edges of the walls of the device 24 by the resilient coverings 27 ensures that there is no spillage of untreated liquid or separated solids directly into the catchment tank 20.

Drained solids retained on the filter conveyor 10 are carried to the discharge edge of the apparatus wherefrom they are removed by any suitable stripping device, e.g., a power driven rotary brush 40, or vacuum apparatus, for disposal as required. Preferably a water jet spraying means 41 is provided for cleaning the filter panels 11 before they return to the catchment tank 20.

In order to provide a closed juncture between adjacent filter panels 11, the frames 13 thereof are formed at their ends with overlapping flanges 17, 18 (FIG. 3) which, in the operative run of filter conveyor 10 through catchment tank assume the positions shown.

Although filter panels 11 of wedge wire construction have been found in experimental practice to be eminently suited to the continuous removal of fine solids from liquor and to provide a final clarification of the order hereinbefore referred to, filter panels of other construction may of course be utilized if so required.

It will be seen that the invention provides apparatus capable of effecting a continuous separation of fine solids from liquors in that no cessation in operation is required to permit cleaning of deposited solids from the filter elements, as is necessary with conventional filter means.

We claim:

1. Filtering apparatus comprising an endless filter conveyor comprising a series of perforate panels, rotatably mounted sprockets, endless chains carrying said panels therebetween and extending around said sprockets, a prime mover operatively connected to at least one of said sprockets, a catchment tank located between upper and lower runs of said conveyor, means for guiding a part of the upper run of said conveyor downwardly within and upwardly out of said catchment tank, overflow outlets for filtered liquid arranged so as to maintain the liquid in said catchment tank at a predetermined level above that part of said conveyor which is guided through said tank, valve means for controlling the flow of liquid from said outlets, a retaining device supported from and between the side walls of said catchment tank and comprising a transverse wall and two divergent side walls extending therefrom in the direction of travel of said filter conveyor, said walls having resilient lower edges in sealing engagement with said conveyor, means for directing liquid to be filtered into said tank within the confines of said retaining device, and means for removing deposited solids from the discharge end of said conveyor.

2. Filtering apparatus as claimed in claim 1, wherein said filter conveyor panels are composed of closely set wedge wires.

3. Filtering apparatus as claimed in claim 2, wherein each of said panels includes a surrounding frame, said frames being provided at each end with a flange, and said flanges being arranged so as to overlap and form closed junctures between adjacent panels during operative runs of said filter conveyor through said catchment tank.

4. Filtering apparatus as claimed in claim 1, wherein said means for removing deposited solids from said filter conveyor comprises a power driven stripping device.

5. Filtering apparatus as claimed in claim 4, including means for cleaning said filter conveyor prior to its entry into said catchment tank.

6. Filtering apparatus as claimed in claim 1, including means adjustably supporting said retaining walls within said catchment tank.

* * * * *